(12) United States Patent
Hernandez

(10) Patent No.: US 11,552,931 B2
(45) Date of Patent: Jan. 10, 2023

(54) MULTIPOINT MESH VIRTUAL PRIVATE NETWORK (MMVPN)

(71) Applicant: MAG DS Corp., Fairfax, VA (US)

(72) Inventor: Jason Hernandez, Fort Walton Beach, FL (US)

(73) Assignee: MAG DS Corp., Fairfax, VA (US)

(*) Notice: Subject to any disclaimer, the term of this patent is extended or adjusted under 35 U.S.C. 154(b) by 274 days.

(21) Appl. No.: 17/067,491

(22) Filed: Oct. 9, 2020

(65) Prior Publication Data

US 2021/0112036 A1    Apr. 15, 2021

Related U.S. Application Data

(60) Provisional application No. 62/913,882, filed on Oct. 11, 2019.

(51) Int. Cl.
| | |
|---|---|
| *H04L 9/40* | (2022.01) |
| *H04L 45/58* | (2022.01) |
| *H04L 12/46* | (2006.01) |
| *H04L 61/4552* | (2022.01) |

(52) U.S. Cl.
CPC ...... *H04L 63/0272* (2013.01); *H04L 12/4641* (2013.01); *H04L 45/58* (2013.01); *H04L 61/4552* (2022.05); *H04L 63/0485* (2013.01)

(58) Field of Classification Search
CPC ............. H04L 63/0272; H04L 61/4552; H04L 12/4641; H04L 45/58; H04L 63/0485; H04L 12/4663
See application file for complete search history.

(56) References Cited

U.S. PATENT DOCUMENTS

| | | | |
|---|---|---|---|
| 2009/0296714 A1* | 12/2009 | Gerber | ............... H04L 12/4641 370/395.31 |
| 2019/0253393 A1* | 8/2019 | Syvänne et al. | .... H04L 63/0272 |
| 2020/0252234 A1* | 8/2020 | Ramamoorthi | ......... H04L 45/22 |

\* cited by examiner

*Primary Examiner* — Thu V Nguyen
*Assistant Examiner* — Aye M Aung
(74) *Attorney, Agent, or Firm* — The Watson IP Group, PLC; Jovan N. Jovanovic

(57) ABSTRACT

The disclosure is directed to a method and system including a first node that stores a first multipoint mesh VPN database including a plurality of underlay addresses in an underlay network for a plurality of nodes, respectively, and a plurality of VPN addresses in a multipoint mesh VPN for the plurality of nodes, respectively. The first node also receives a second multipoint mesh VPN database from a second node, the second multipoint mesh VPN database including underlay and VPN addresses for the third node. The first node further receives a third multipoint mesh VPN database from the third node, the third multipoint mesh VPN database including underlay and VPN addresses for the second node. The first node additionally compares the databases to determine if underlay addresses and VPN addresses are missing from the first multipoint mesh VPN database.

20 Claims, 6 Drawing Sheets

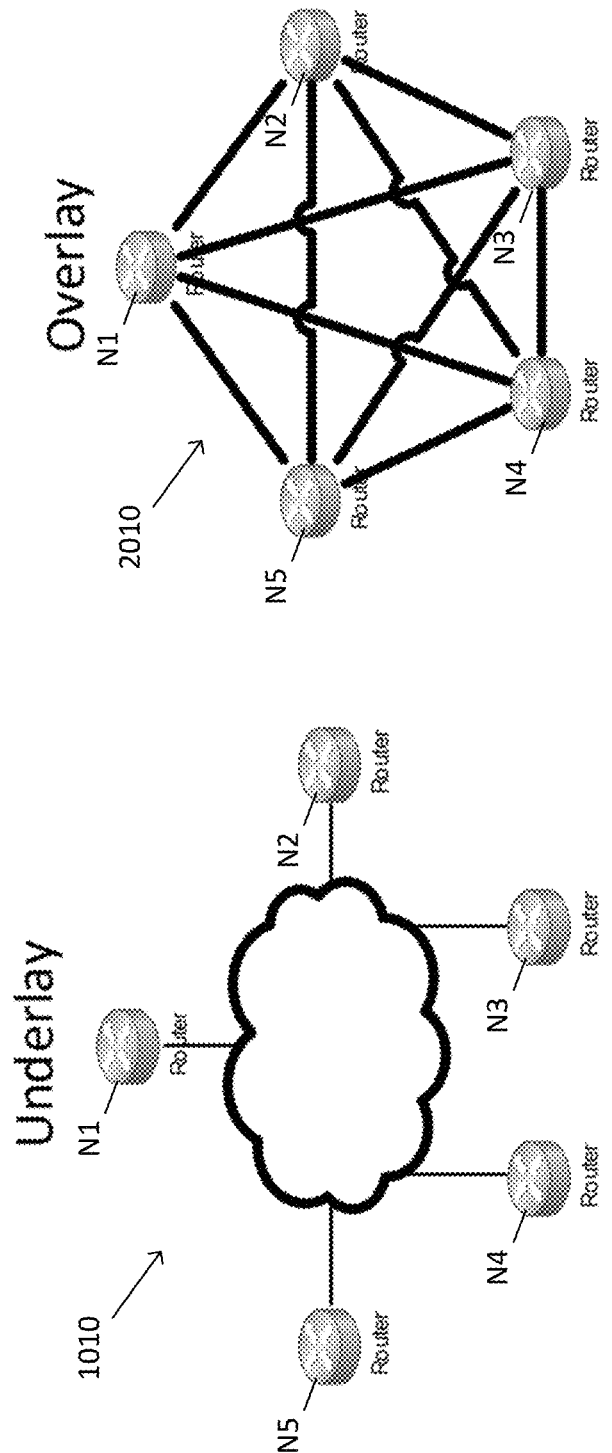

outside,inside,,oreach,,ireach
192.168.1.1,172.16.1.1,y,y
192.168.2.1,172.16.1.2,y,n
192.168.3.1,172.16.1.3,y,y

MULTIPOINT MESH VIRTUAL PRIVATE NETWORK (MMVPN)

CROSS-REFERENCE TO RELATED APPLICATION

This application claims priority from U.S. Pat. App. Ser. No. 62/913,882 entitled "MULTIPOINT MESH VIRTUAL PRIVATE NETWORK (MMVPN)" filed Oct. 11, 2019, the entire disclosure of which is hereby incorporated by reference in its entirety.

BACKGROUND OF THE DISCLOSURE

1. Field of the Disclosure

The disclosure relates in general to a virtual private network (VPN), and more particularly, to a multipoint mesh VPN.

2. Background Art

The Internet is an invaluable tool for businesses and consumers. However, the Internet is a public network that is subject to security concerns when transmitting and receiving sensitive information, such as banking information, military information, client privileged information, etc. VPNs were developed to address such security concerns. VPNs extend a private network across this public network, allowing users to transmit and receive data as if they were directly connected to this private network typically by encrypting this data. VPNs typically utilize an encrypted layered tunneling protocol to communicate this encrypted data, with examples of VPNs including Dynamic Multipoint VPN (DMVPN), Group Encrypted Transport (GETVPN), AutoVPN, etc.

SUMMARY OF THE DISCLOSURE

The disclosure is directed to a system comprising a first node that stores a first multipoint mesh VPN database including a plurality of underlay addresses in an underlay network for a plurality of nodes, respectively, and a plurality of VPN addresses in a multipoint mesh VPN for the plurality of nodes, respectively. The first node also receives a second multipoint mesh VPN database from a second node, the second multipoint mesh VPN database including a third underlay network address for a third node and a third VPN address for the third node. The first node further receives a third multipoint mesh VPN database from the third node, the third multipoint mesh VPN database including a second underlay network address for the second node and a second VPN address for the second node. The first node additionally compares the first multipoint mesh VPN database to the second and third multipoint mesh VPN databases to determine if either the second and third underlay addresses and the second and third VPN addresses are missing from the first multipoint mesh VPN database. The first node also adds the second and third underlay addresses and the second and third VPN addresses to the first multipoint mesh VPN database based on the comparison, if either the second and third underlay addresses and the second and third VPN addresses are determined to be missing from the first multipoint mesh VPN database. The second node stores the second multipoint mesh VPN database including the third underlay network address for the third node and the third VPN address for the third node, and transmits the second multipoint mesh VPN database to the first node. The third node stores the third multipoint mesh VPN database including the second underlay network address for the second node and the second VPN address for the second node, and transmits the third multipoint mesh VPN database to the first node. The first node establishes the multipoint mesh VPN with the second and third nodes using second and third VPN addresses, respectively, added to the first multipoint mesh VPN database, without relying on a hub.

In some configurations, the first, second, and third multipoint mesh VPN databases each further include an indication of an ability of the first, second, and third nodes to communicate with other nodes via the underlay network, and an indication of an ability of the first, second, and third nodes to communicate with other nodes via the multipoint mesh VPN, the first, second, and third nodes each transmitting the network addresses in the underlay network and the network addresses in the multipoint mesh VPN to other nodes, without transmitting the indications of the abilities of the first, second, and third nodes to communication with other nodes via the underlay network and the multipoint mesh VPN.

In some configurations, the first node further updates the first multipoint mesh VPN database to note a first error condition if the first node cannot establish communications with either the second and third nodes via the second and third underlay addresses and a second error condition if the first node cannot establish communications with the second and third nodes via the second and third VPN addresses.

In some configurations, the first, second, and third nodes establish direct Internet Protocol Security (IPSEC)/Internet key Exchange (IKE) communications prior to establishing the multipoint mesh VPN.

In some configurations, the first, second, and third multipoint mesh VPN databases each include four columns, a first column including particular network addresses in the underlay network, the second column including particular network addresses in the multipoint mesh VPN, the third column including an indication of an ability to communicate with particular nodes with the underlay network, and a fourth column including an indication of an ability to communicate with particular nodes with the multipoint mesh VPN.

In some configurations, the first, second, and third multipoint mesh VPN databases are in the Comma-Separated Values (CSV) format.

In some configurations, the underlay network is the Internet.

In some configurations, the overlay network utilizes at least one of Internet Protocol Version 4 (IPV4) and Internet Protocol Version 6 (IPV6).

In some configurations, the first, second, and third nodes are routers.

In some configurations, the first node is designated as a primary node that creates the first multipoint mesh VPN database and shares the first multipoint mesh VPN database with other nodes.

The disclosure also directed to a method comprising storing, by a first node, a first multipoint mesh VPN database including a plurality of underlay addresses in an underlay network for a plurality of nodes, respectively, and a plurality of VPN addresses in a multipoint mesh VPN for the plurality of nodes, respectively. The method further comprises receiving, by the first node, a second multipoint mesh VPN database from a second node, the second multipoint mesh VPN database being stored by the second node and including a third underlay network address for a third node and a third VPN address for the third node. The method yet further comprises receiving, by the first node, a third multipoint mesh VPN database from the third node, the third multipoint mesh VPN database being stored by the third node and including a second underlay network address for the second node and a second VPN address for the second node. The method even further comprises comparing, by the first node, the first multipoint mesh VPN database to the second and third multipoint mesh VPN databases to determine if either the second and third underlay addresses and the second and third VPN addresses are missing from the first multipoint mesh VPN database. The method also comprises adding, by the first node, the second and third underlay addresses and the second and third VPN addresses to the first multipoint mesh VPN database based on the comparison, if either the second and third underlay addresses and the second and third VPN addresses are determined to be missing from the first multipoint mesh VPN database. The method further comprises establishing, by the first node, the multipoint mesh VPN with the second and third nodes using second and third VPN addresses, respectively, added to the first multipoint mesh VPN database, without relying on a hub.

In some configurations, the first, second, and third multipoint mesh VPN databases each further include an indication of an ability of the first, second, and third nodes to communicate with other nodes via the underlay network, and an indication of an ability of the first, second, and third nodes to communicate with other nodes via the multipoint mesh VPN, the method further including transmitting, by each of the first, second, and third nodes, the network addresses in the underlay network and the network addresses in the multipoint mesh VPN to other nodes, without transmitting the indications of the abilities of the first, second, and third nodes to communication with other nodes via the underlay network and the multipoint mesh VPN.

In some configurations, the method further comprises updating, by the first node, the first multipoint mesh VPN database to note a first error condition if the first node cannot establish communications with either the second and third nodes via the second and third underlay addresses and a second error condition if the first node cannot establish communications with the second and third nodes via the second and third VPN addresses.

In some configurations, the method further comprises establishing, by the first, second, and third nodes, direct Internet Protocol Security (IPSEC)/Internet key Exchange (IKE) communications prior to establishing the multipoint mesh VPN.

In some configurations, the first, second, and third multipoint mesh VPN databases of the method each include four columns, a first column including particular network addresses in the underlay network, the second column including particular network addresses in the multipoint mesh VPN, the third column including an indication of an ability to communicate with particular nodes with the underlay network, and a fourth column including an indication of an ability to communicate with particular nodes with the multipoint mesh VPN.

In some configurations, the first, second, and third multipoint mesh VPN databases of the method are in the Comma-Separated Values (CSV) format.

In some configurations, the underlay network of the method is the Internet.

In some configurations, the overlay network of the method utilizes at least one of Internet Protocol Version 4 (IPV4) and Internet Protocol Version 6 (IPV6).

In some configurations, the first, second, and third nodes of the method are routers.

In some configurations, the method further comprises designating the first node as a primary node that creates the first multipoint mesh VPN database, and sharing the first multipoint mesh VPN database with other nodes.

BRIEF DESCRIPTION OF THE DRAWINGS

The disclosure will now be described with reference to the drawings wherein:

FIG. 1 illustrates an exemplary coupling of a plurality of nodes via an underlay network, in accordance with at least one of the configurations disclosed herein;

FIG. 2 illustrates an exemplary coupling of the plurality of nodes shown in FIG. 1 via an overlay network, in accordance with at least one of the configurations disclosed herein;

FIG. 5 illustrates an exemplary multipoint mesh VPN database that is utilized by the nodes of the overlay network shown in FIGS. 2 and 3, in accordance with at least one of the configurations disclosed herein;

DETAILED DESCRIPTION OF THE DISCLOSURE

Figure 3:
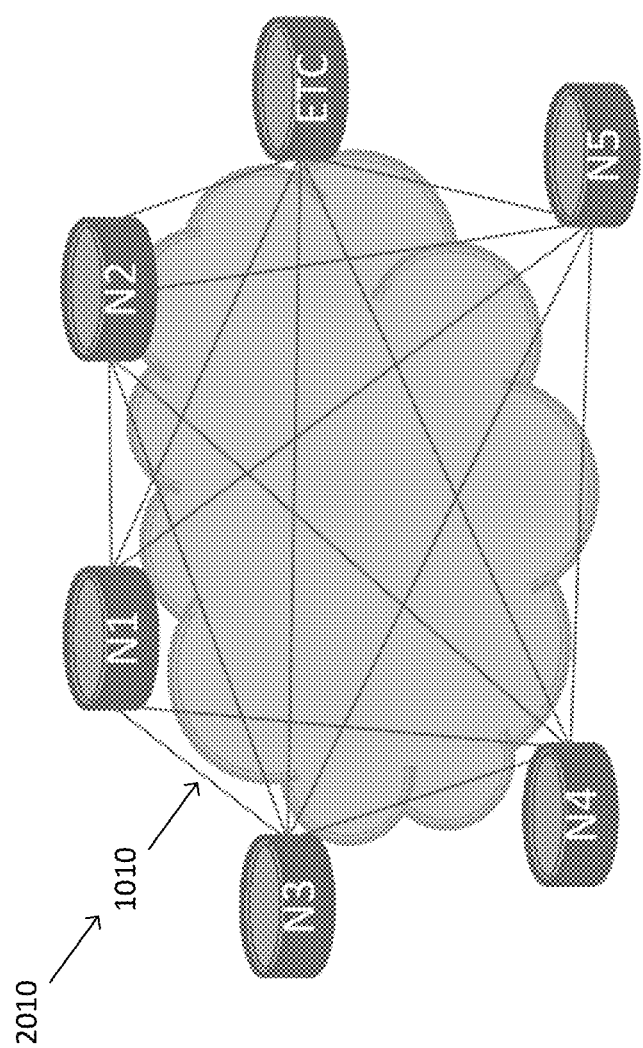
FIG. 3 illustrates an exemplary combination of the underlay network of FIG. 1 and overlay network of FIG. 2, in accordance with at least one of the configurations disclosed herein.

While this disclosure is susceptible of configuration(s) in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

This disclosure addresses limitation(s) associated with typical VPN technologies. One such limitation is that typical VPN technologies do not allow for a true mesh of nodes, e.g., routers. Moreover, streaming services, and video distribution, over many VPN types are inadequate for securing delivery of video to multiple nodes. The configurations disclosed herein mitigate or overcome such limitations. The configurations do so by creating a hubless technology that allows each node to create its own mech of connections, or a multipoint mesh VPN (MMVPN) of networked nodes. This multipoint mesh VPN network can be used to deliver better meshed network VPN multicast video simultaneously to multiple interested parties (e.g., end user devices such as personal computers, tablet computers, cell phones, etc.) without the bandwidth impacts experienced by other VPN technologies.

The configurations disclosed herein provide a truly fully meshed and tunneled VPN architecture, as opposed to relying on typical VPN technologies that are either a node-to-node architecture, a centralized hub and spoke type architecture, or a "meshed" VPN that is not truly meshed but still relies on a hub for at least some functionality of the VPN. In each of these instances connections are made between two devices. This poses problems. There is no direct communication between the individual nodes, and all communication is directed through the hub. If the hub goes down, communication ceases. Also, and especially in the multicast environment, there is not a true ability to multicast. That is, when a multicast message is received from a node and directed to the hub, the message is recreated and sent individually to each of the spoke nodes, thus, the bandwidth utilized increases dramatically, as multiple streams are created instead of a single multicast stream.

Referring now to the drawings and in particular to FIG. 1, a system 1000 is illustrated as including a plurality of nodes, such as nodes N1-N5, that are coupled to each other via an underlay network 1010, such as the Internet which can be implemented over one or more terrestrial connections (e.g., fiber optic, cellular, etc.) and/or satellite connections (e.g., Starlink, HughesNet, etc.). Each of the nodes N1-N5 are able to communicate with each of the other nodes N1-N5, e.g., node N1 can communicate with nodes N2-N5, node N2 can communicate with nodes N1 and N3-N5, node N3 can communicate with nodes N1, N2, N4, N5, etc. The nodes N1-N5 each include underlay interfaces or interfaces that are reachable over the public internet or a private/public network. Likewise, the underlay IP address is the hard IP address for the underlay interface, a loopback IP address, or other underlay reachable IP address. For the underlay network 1010 to be a true underlay network, all underlying interfaces should be reachable by other underlying interfaces, if not this can prevent a full mesh that is possible in accordance with the configurations disclosed herein.

With reference to FIG. 2, each of the nodes N1-N5 is also able to establish an overlay network of VPNs, referenced herein as a Multipoint Mesh VPN (multipoint mesh VPN) 1020 as described in more detailed below, by each of the other nodes N1-N5, e.g., via IPV4 and/or IPv6. Thus, the nodes N1-N5 communicate via this multipoint mesh VPN 2010 to tunnel traffic therebetween. The nodes N1-N5 also each include overlay interfaces or tunneled interfaces that are only reachable once IKE/IPSEC is established between the underlay interfaces. Likewise, the overlay IP address is the IP address of the overlay interface. In accordance with at least one configuration, all of the overlay participating interfaces are placed into the same L2BC broadcast domain.

The multipoint mesh VPN 2010 supports various features that provide benefits over typical VPNs, such as supporting data encryption from any node to any node, supporting multicast header pass through, supporting topology updates, up/down statuses, supporting internode status updates, supporting passphrase and certificate-based VPNs, supporting Pre-Shared Key and Certificates, and/or supporting Quality of Service (QoS). The multipoint mesh VPN 2010 provides secure communications, such as via direct Internet Protocol Security (IPSEC)/Internet key Exchange (IKE) communications to all of the nodes N1-N5 participating in the multipoint mesh VPN 2010. To accomplish this, each of the nodes N1-N5 build and store a multipoint mesh VPN database, such as a multipoint mesh VPN database 3000 (FIG. 5) and check this database amongst nodes already in the network. The multipoint mesh VPN database 3000 is exemplary, not limited to three (3) nodes, thus can include entries for any number of nodes, and can even include additional information for each node listed. At least a portion of this multipoint mesh VPN database 3000 is shared to all participating nodes within the multipoint mesh VPN 2010. Each of the nodes N1-N5 are responsible for verifying individually that the nodes N1-N5 can communicate using the underlay network 1010 to establish the multipoint mesh VPN 2010. The nodes N1-N5 build and maintain secure VPN tunnels for as long as the nodes N1-N5 are in the multipoint mesh VPN 2010.

The multipoint mesh VPN 2010 is first established between two nodes that share a VPN database, any two of the nodes N1-N5. The first two nodes connect traditionally, by first establishing IKE then IPSEC. The multipoint mesh VPN database 3000 is then established, such as the first two entries shown in the first and second rows thereof. For example, one of the nodes N1-N5 (e.g., node N1) is designated as the "primary" node, either by designated router (DR) priority or by election. Then, this primary node, node N1, initiates creating the multipoint mesh VPN database 3000 and shares at least a portion of the multipoint mesh VPN database 3000 that includes its overlay and underlay IP addresses that it added to the multipoint mesh VPN database 3000 with another of the nodes N2-N5, e.g., node N2. Each of the nodes N1-N5 will check for reachability of overlay and underlay IP addresses and likewise add their own overlay and underlay IP addresses to the multipoint mesh VPN database 3000, respectively. If any of the nodes N1-N5 are determined to be unreachable for any reason by any of the other nodes N1-N5, any of the nodes N1-N5 that makes such a determination can remove the unreachable node from the multipoint mesh VPN database 3000. Thus, based on adding and removing overlay and underlay IP addresses to the multipoint mesh VPN database 3000, the nodes N1-N5 can dynamically add active nodes and remove inactive nodes from the underlay network 1010 and the overlay multipoint mesh VPN 2010.

Figure 4:
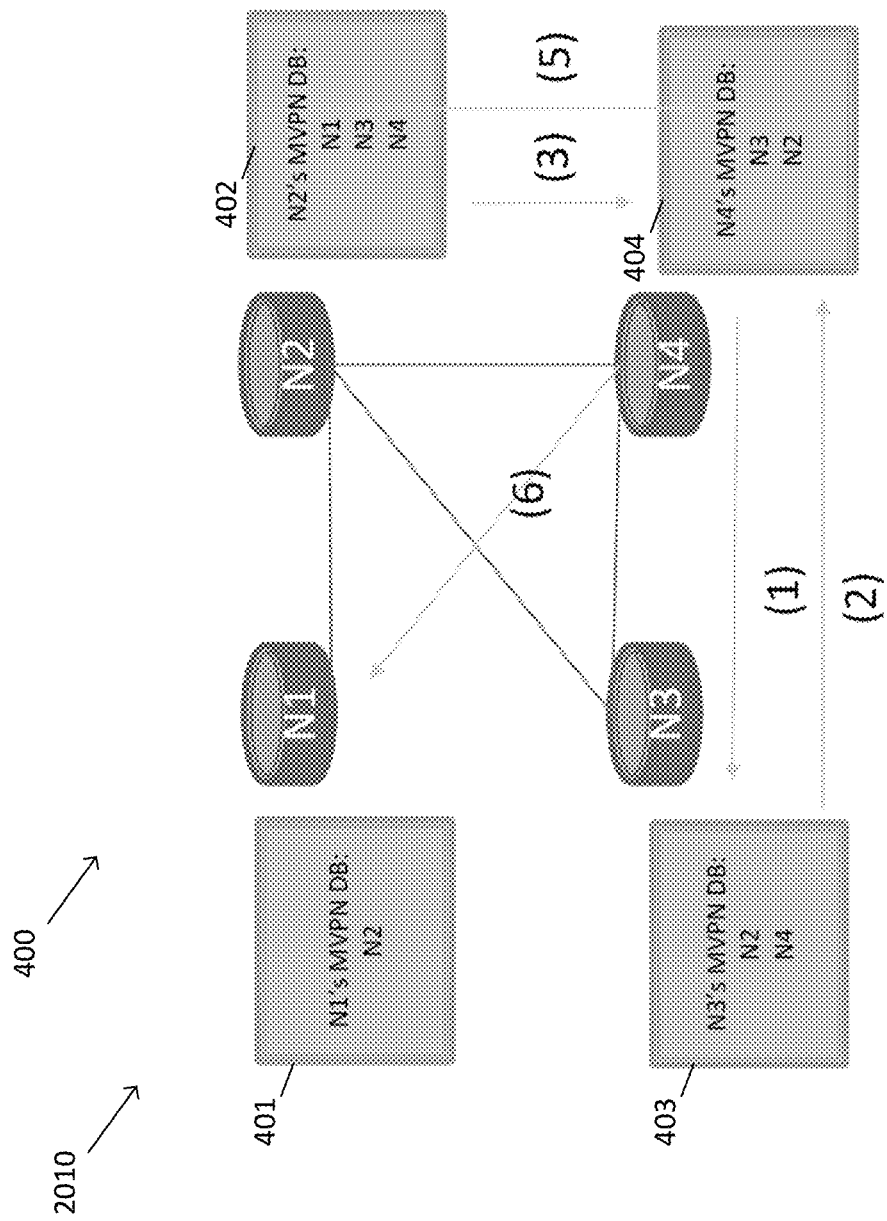
FIG. 4 illustrates exemplary processes by which nodes N1-N4 establish a multipoint mesh VPN via dual verification, in accordance with at least one of the configurations disclosed herein.

FIG. 4 illustrates exemplary processes within a system 400 including the nodes N1-N4 that establish the multipoint mesh VPN 2010 via a dual verification method. The processes described herein for FIG. 4 occurs after two of the nodes N1-N4 have initially been manually configured with network addresses to establish communications and a VPN therebetween. Thereafter, such dual verification method can be used to establish the multipoint mesh VPN 2010 that includes more than the two nodes that were manually configured. In this example, a first process (1) is shown in which node N4 connects to node N3. In response to node N4 connecting to node N3, node N4 requests that node N3's multipoint mesh VPN database 403 be transmitted to node N4. In a second process (2), node N4 then performs a differential, that is it compares the "learned" or received multipoint mesh MVPN database 403 from node N3 to its own multipoint mesh MVPN database 404. Since in this example the underlay and multipoint mesh VPN addresses associated with node N2 is missing from node N4's own multipoint mesh MVPN database 404, node N4 adds the underlay and multipoint mesh VPN addresses associated with node N2 to its own multipoint mesh MVPN database 404, and ignores itself. As shown, node N4's multipoint mesh MVPN database 404 then lists which nodes it potentially is able to connect with and establish the multipoint mesh VPN 2010 from nodes N1-N4. In this example, node N4 lists the underlay and multipoint mesh VPN addresses associated with nodes N3 and N2.

In a third process (3), node N4 connects to node N2. Node N4 receives two (2) MVPN databases for it to be able to stop learning multipoint mesh VPN databases. In response to node N4 connecting to node N2, in process (5) node N4 receives node N2's multipoint mesh VPN database, in response to node N4 requesting node N2's multipoint mesh VPN database. In response to receiving node N2's multipoint mesh VPN database, node N2 transmits and node N4 receives or "learns" node N2's multipoint mesh VPN database 402. In response to node N4 receiving node N2's multipoint mesh VPN database 402, node N4 compares node N2's multipoint mesh VPN database 402 to its own multipoint mesh VPN database 404. Node N4 then adds the underlay and multipoint mesh VPN addresses associated with node N1 (not shown) to its own multipoint mesh VPN database 404 because the underlay and multipoint mesh VPN addresses associated with node N1 are not currently in its own multipoint mesh VPN database 404. Now that node N4 has information for connecting with node N1, node N4 connects with node N1 as well, at process (6). Thus, once the underlay and multipoint mesh VPN addresses associated with node N1 is added to node N4's multipoint mesh VPN database 404, node N4 can establish the multipoint mesh VPN 2010 with all of nodes N1, N2, and N3 without having to rely on a hub for establishing the multipoint mesh VPN 2010 with these nodes.

With reference to FIG. 5, the multipoint mesh VPN database 3000 is illustrated that is stored and utilized by the nodes N1-N5 of the overlay network of the multipoint mesh VPN 2010, as discussed above. The multipoint mesh VPN database 3000 is illustrated as including three (3) Internet Protocol (IP) addresses for simplicity of explanation, but can include any number of IP address for any number of nodes that join the multipoint mesh VPN 2010, not limited to a maximum number of nodes. In this example, the multipoint mesh VPN database 3000 is in the Comma-Separated Values (CSV) format and includes four (4) columns and three (3) rows, thus four (4) entries for each node listed therein, although other formats are possible such as a table. A first column provides for information associated with an "outside" network corresponding to a particular node's (e.g., any one of the nodes N1-N5 referenced as node Nx) outside IP address or that particular node Nx's address within the underlay network 1010, a second column provides information associated with an "inside" network corresponding to that particular node Nx's address inside IP address or that particular node Nx's address within the overlay network 2010, a third column provides for information associated with "oreach" or that particular node Nx's ability to "reach" or communicate with another particular node Nx via the outside network or underlay network 1010 designated as "y" for yes or "n" for no, and a fourth column provides information associated with "ireach" or that particular node Nx's ability to "reach" or communicate with another particular node Nx via an inside network or the overlay network 2010 designated as "y" for yes or "n" for no. In other configurations, the multipoint mesh VPN database 3000 can include additional columns for other information that is needed by the nodes N1-N5 of the multipoint mesh VPN 2010.

In at least one configuration, the multipoint mesh VPN database 3000 includes two "sets" of fields, a first set of fields is globally shared by the nodes N1-N5 and includes the underlying IP addresses and the overlaying IP addresses, discussed above. A second set of fields is locally significant to the particular node Nx storing the multipoint mesh VPN database 3000 and includes the reachability fields discussed above, which are not transmitted to or shared with other nodes. Thus, in at least one configuration the nodes N1-N5 only transmit a portion of the multipoint mesh VPN database 3000 with other nodes, without transmitting the reachability fields discussed above. If the underlying IP address for another particular node Nx2 is not reachable within a timeout period of time by the particular node Nx, the particular node Nx will not attempt to establish IKE and an error condition will occur that is noted in the multipoint mesh VPN database 3000 until cleared. In at least one configuration, if the underlay IP address for the another particular node Nx2 is unreachable by the particular node Nx within the timeout period entries for the another particular node Nx2 are deleted from the multipoint mesh VPN database 3000. If the underlay IP address for the another particular node Nx2 is reachable by the particular node Nx, then the particular node Nx will establish IKE and IPSEC with the reachable another particular node Nx2, using either a common passphrase or certificate-based keys. In at least one other configuration, the multipoint mesh VPN 2010 can use a plurality of such databases, one that is shared that includes the underlying IP addresses and the overlaying IP addresses, discussed above, and another database that includes the second set of fields, discussed above.

Once IPSEC is established, the particular node Nx will attempt to reach the IP address listed within the multipoint mesh VPN 2010. If the overlay IP address for the another particular node Nx2 is unreachable by the particular node Nx within a timeout period of time an error condition will occur, the connection will not establish, and the multipoint mesh VPN database 3000 is updated to reflect such an error condition. In at least one configuration, if the overlay IP address for the another particular node Nx2 is unreachable by the particular node Nx within the timeout period entries for the another particular node Nx2 are deleted from the multipoint mesh VPN database 3000. If the overlay IP address is reachable by the another particular node Nx2, the connection is considered complete, and the multipoint mesh VPN database 3000 is updated to reflect this condition also. In at least one configuration, passphrases and certificates will not be sent with the multipoint mesh VPN database 3000, with the multipoint mesh VPN database 3000 only being sent after IKE and IPSEC is established and the overlay IP address is reachable.

Following "coupling" or establishing communications between the first two nodes within the multipoint mesh VPN 2010 (e.g., nodes N1 and N2), all subsequent nodes (e.g., nodes N3-N5) can then enter the multipoint mesh VPN 2010, with the nodes first establishing a link between themselves and one of the other established nodes. Once a connection is established with one of the other established nodes N1 or N2, this newly establishing node Nx receives the multipoint mesh VPN database 3000. The newly establishing node Nx will then attempt to broker a connection between itself and the other nodes listed in the multipoint mesh VPN database 3000, e.g., sequentially. As discussed in more detail below with reference to the example illustrated in FIG. 4, a second multipoint mesh VPN database will be received by any of the nodes N1-N5 after successful connection to a second node. A requesting node, any of nodes N1-N5, compares this second multipoint mesh VPN database to the requesting node's own multipoint mesh VPN database and adds any missing entries to this second multipoint mesh VPN database.

In at least one configuration, the last entered node Nx has the responsibility of sending updated copies of the multipoint mesh VPN database 3000 to the other nodes within the multipoint mesh VPN 2010, which prevents loops and redundant entries in the multipoint mesh VPN database 3000. In at least one configuration, each of the nodes N1-N5 are responsible for verifying, e.g., at a periodic interval, their connections to all other nodes in the multipoint mesh VPN database 3000, respectively. A benefit of periodic updates is to allow any two nodes from the nodes N1-N5 that were previously unable to communicate with each other to try again at an attempt to establish a "direct" connect (Internet connections are not direct but multipath). Periodic verifications also ensure that all nodes listed within the multipoint mesh VPN database 3000 are still reachable. Thus, the nodes N3-N5 only need to know how to reach other nodes once the primary node N1 or the secondary node N2 sends the multipoint mesh VPN database 3000. The nodes N3-N5 would then attempt to reach each of the nodes listed within the multipoint mesh VPN database 3000 on their own.

As discussed above, the multipoint mesh VPN 2010 supports multicast. This multicast can be handled in different ways. The multicast can be tunneled through the overlay interface disclosed above, and/or the multicast can carry the multicast group header from the overlay interface to the underlay interface, with encrypted multicast traffic taking on header information from the underlying interface. A benefit of this is that the nodes N1-N5 via their underlay interfaces, respectively, can deliver multicast encrypted data using the multicast group header, which significantly reduces bandwidth requirements that typically are imposed on VPN nodes for delivering the encrypted multicast data. To achieve this, the nodes N1-N5 can copy a multicast header from the underlay network 1010 into the overlay multipoint mesh VPN 2010. Typically, this multicast encrypted data is delivered via individual VPN addresses associated with individual nodes which results in delivery of multiples copies of the encrypted multicast data, multiplying the bandwidth requirements for each node that receives the encrypted multicast data.

Figure 6:
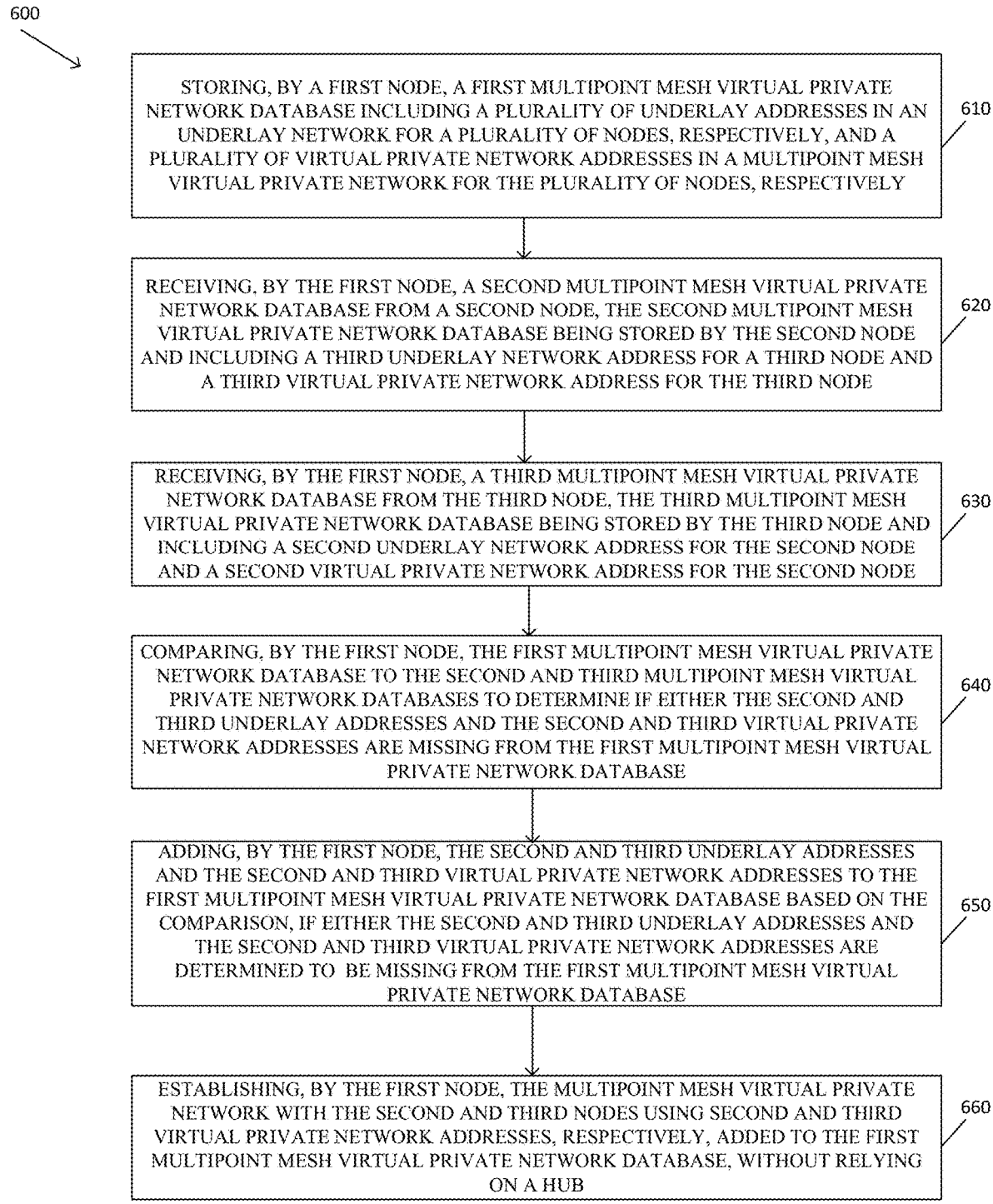
FIG. 6 illustrates an exemplary flowchart for establishing a multipoint mesh VPN, in accordance with at least one of the configurations disclosed herein.

FIG. 6 illustrates a flowchart of a method 600 for establishing a multipoint mesh VPN, such as the multipoint mesh VPN 2010 discussed above. For example, the method 600 is a flowchart for the processes performed by node N4, as described above for FIG. 4. The method 600 can being with a process 610. Process 610 can include storing, by a first node such as the node N4, a first multipoint mesh VPN database (e.g., node N4's multipoint mesh VPN database) including a plurality of underlay addresses in an underlay network for a plurality of nodes, respectively, and a plurality of VPN addresses in a multipoint mesh VPN (e.g., multipoint mesh VPN 2010) for the plurality of nodes, respectively, such as described above for node N4. Process 610 can proceed to process 620.

Process 620 can include receiving, by the first node such as the node N4, a second multipoint mesh VPN database from a second node, such as either of nodes N3 and N2, as discussed above. This second multipoint mesh VPN database is stored by the second node and includes a third underlay network address for a third node and a third VPN address for the third node, such as described above for node N4. Process 620 can proceed to process 630.

Process 630 can include receiving, by the first node such as the node N4, a third multipoint mesh VPN database from the third node, such as either of nodes N3 and N2, as discussed above. The third multipoint mesh VPN database is stored by the third node and including a second underlay network address for the second node and a second VPN address for the second node, such as described above for node N4. Process 630 can proceed to process 640.

Process 640 can include comparing, by the first node such as the node N4, the first multipoint mesh VPN database to the second and third multipoint mesh VPN databases. This comparison is used to determine if either the second and third underlay addresses and the second and third VPN addresses are missing from the first multipoint mesh VPN database, such as described above for node N4. Process 640 can proceed to process 650.

Process 650 can include adding, by the first node such as the node N4, the second and third underlay addresses and the second and third VPN addresses to the first multipoint mesh VPN database based on the comparison performed by process 640. This addition is performed if either the second and third underlay addresses and the second and third VPN addresses are determined by the first node to be missing from the first multipoint mesh VPN database, such as the multipoint mesh VPN database stored by the node N4. Process 650 can proceed to process 660.

Process 660 can include establishing, by the first node such as the node N4, the multipoint mesh VPN with the second and third nodes using second and third VPN addresses, respectively, added to the first multipoint mesh VPN database in process 650, without relying on a hub, such as described above for node N4 establishing multipoint mesh VPN 2010 with the nodes N1-N3.

Figure 7:
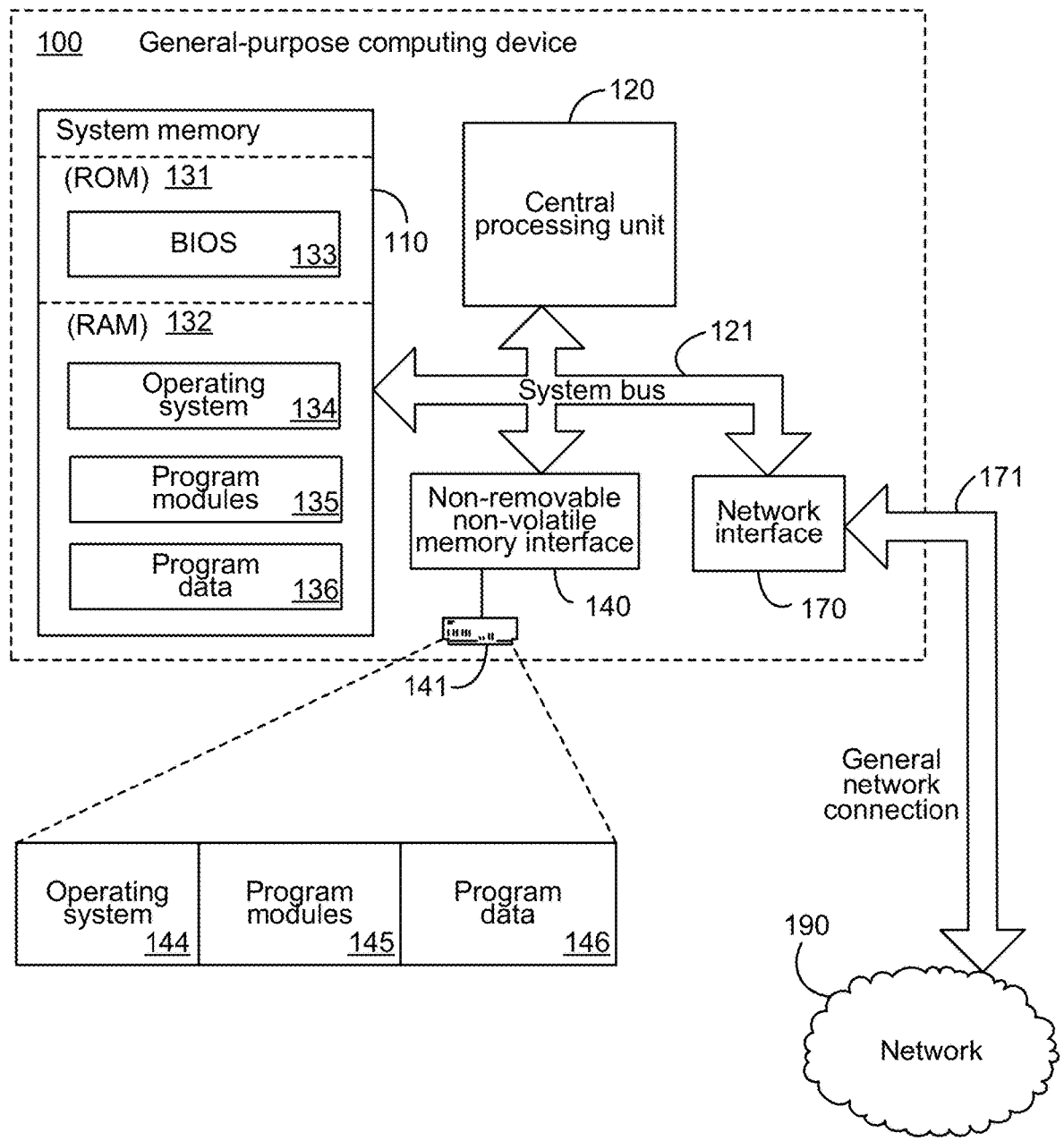
FIG. 7 of the drawings illustrates an exemplary general-purpose computing device, in accordance with at least one of the configurations disclosed herein.

With reference to FIG. 7, an exemplary general-purpose computing device is illustrated in the form of an exemplary general-purpose computing device 100. The general-purpose computing device 100 may be of the type utilized for the nodes N1-N5 (FIGS. 1-3), as well as other computing devices with which the underlay network 1010 and/or multipoint mesh VPN 2010 may communicate. As such, it will be described with the understanding that variations can be made thereto.

The exemplary general-purpose computing device 100 can include, but is not limited to, one or more central processing units (CPUs) 120, a system memory 130 and a system bus 121 that couples various system components including the system memory 130 to the CPU 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the general-purpose computing device 100 can be physically co-located, such as on a single chip. In such a case, some or all of the system bus 121 can be nothing more than communicational pathways within a single chip structure and its illustration in FIG. 7 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, Random Access Memory (RAM) 132, Read Only Memory (ROM) 131, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 7 is a general network connection 171 to the network 190 (e.g., the underlay network 1010), which can include a local area network (LAN), a terrestrial wide area network (WAN) such as the Internet, a satellite WAN such as a low earth orbit constellation, or other networks. The computing device 100 is connected to the general network connection 171 through a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 can include system memory 110 which can include the ROM 131 and/or the RAM 132. The general-purpose computing device 100 may also include other removable/non-removable, volatile/nonvolatile computer storage media. By way of example only, FIG. 7 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as interface 140.

The drives and their associated computer storage media discussed above and illustrated in FIG. 7, provide storage of computer readable instructions, data structures, program modules and other data for the general-purpose computing device 100. In FIG. 7, for example, hard disk drive 141 is illustrated as storing operating system 144, other program modules 145, and program data 146. Note that these components can either be the same as or different from Basic Input/Output System (BIOS) 133, operating system 134, other program modules 135 and program data 136, stored in RAM 132. Operating system 144, other program modules 145 and program data 146 are given different numbers here to illustrate that, at a minimum, they are different copies.

With reference to FIGS. 1-3, again, the foregoing description applies to the devices within the underlay network 1010 and the multipoint mesh VPN 2010, as well as to any other computing devices in communication therewith. The CPU 120 is coupled to the network interface 170. The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as to communicate an audio segment(s) in a timely manner.

The nodes N1-N5 can comprise a user interface which can configure the nodes N1-N5. In some instances, the nodes N1-N5 can comprise a keypad and a display that is connected through a wired connection with the central processing unit 120. Of course, with the different communication protocols associated with the network interface 170, the network interface 170 may comprise a wireless device that communicates with the underlay network 1010 through a wireless communication protocol (i.e., Bluetooth, RF, WIFI, etc.). In other configurations, the nodes N1-N5 may comprise a virtual programming module in the form of software that is on, for example, a smartphone, in communication with the network interface 170. In still other configurations, such a virtual programming module may be located in the cloud (or web based), with access thereto through any number of different computing devices. Advantageously, with such a configuration, a user may be able to communicate with the nodes N1-N5 remotely, with the ability to change functionality.

Thus, in accordance with the disclosed features, the multipoint mesh VPN 2010 can be established between by any number of nodes, not limited to the exemplary nodes N1-N5. However, because nodes Nx can have limited processing power, the nodes Nx can be configured to limit the number of other nodes Nx with which they can establish the multipoint mesh VPN 2010 with. In at least one configuration, the nodes Nx can automatically self-configure themselves to limit the number of other nodes Nx that they will establish the multipoint mesh VPN 2010 based on their processing power, respectively. Thus, in this configuration any particular node Nx can establish the multipoint mesh VPN 2010 with more or less other nodes Nx based on its own determined processing power. Alternatively, the nodes Nx can be manually configured to limit the number of other nodes that they can establish the multipoint mesh VPN 2010 with. As typical VPNs rely on a hub to establish their VPNs, the multipoint mesh VPN 2010 does not have such a deficiency, not relying on a hub. The node N1-N5 themselves establish the multipoint mesh VPN 2010 via themselves each sharing and updating of the multipoint mesh VPN database 3000. This technology can be used to support multicast, without having to go through a hub, supporting multicast header pass through, supporting topology updates, up/down statuses, supporting internode status updates, supporting passphrase and certificate-based VPNs, supporting Pre-Shared Key and Certificates, and/or supporting Quality of Service (QoS).

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system, comprising:
a first node to store a first multipoint mesh virtual private network database including a plurality of underlay addresses in an underlay network for a plurality of nodes, respectively, and a plurality of virtual private network addresses in a multipoint mesh virtual private network for the plurality of nodes, respectively, to receive a second multipoint mesh virtual private network database from a second node, the second multipoint mesh virtual private network database including a third underlay network address for a third node and a third virtual private network address for the third node, to receive a third multipoint mesh virtual private network database from the third node, the third multipoint mesh virtual private network database including a second underlay network address for the second node and a second virtual private network address for the second node, to compare the first multipoint mesh virtual private network database to the second and third multipoint mesh virtual private network databases to determine if either the second and third underlay addresses and the second and third virtual private network addresses are missing from the first multipoint mesh virtual private network database, and to add the second and third underlay addresses and the second and third virtual private network addresses to the first multipoint mesh virtual private network database based on the comparison, if either the second and third underlay addresses and the second and third virtual private network addresses are determined to be missing from the first multipoint mesh virtual private network database;
the second node to store the second multipoint mesh virtual private network database including the third underlay network address for the third node and the third virtual private network address for the third node, and to transmit the second multipoint mesh virtual private network database to the first node; and
the third node to store the third multipoint mesh virtual private network database including the second underlay network address for the second node and the second virtual private network address for the second node, and to transmit the third multipoint mesh virtual private network database to the first node;
wherein the first node establishes the multipoint mesh virtual private network with the second and third nodes using second and third virtual private network addresses, respectively, added to the first multipoint mesh virtual private network database, without relying on a hub.

2. The system according to claim 1, wherein the first, second, and third multipoint mesh virtual private network databases each further include an indication of an ability of the first, second, and third nodes to communicate with other nodes via the underlay network, and an indication of an ability of the first, second, and third nodes to communicate with other nodes via the multipoint mesh virtual private network, the first, second, and third nodes each transmitting a portion of the first, second, and third multipoint mesh virtual private network databases, respectively, including the network addresses in the underlay network and the network addresses in the multipoint mesh virtual private network to other nodes, without transmitting the indications of the abilities of the first, second, and third nodes to communication with other nodes via the underlay network and the multipoint mesh virtual private network.

3. The system according to claim 1, wherein the first node further to update the first multipoint mesh virtual private network database to note a first error condition if the first node cannot establish communications with either the second and third nodes via the second and third underlay addresses and a second error condition if the first node cannot establish communications with the second and third nodes via the second and third virtual private network addresses.

4. The system according to claim 1, wherein the first, second, and third nodes establish direct Internet Protocol Security (IPSEC)/Internet key Exchange (IKE) communications prior to establishing the multipoint mesh virtual private network.

5. The system according to claim 1, wherein the first, second, and third multipoint mesh virtual private network databases each include four columns, a first column including particular network addresses in the underlay network, the second column including particular network addresses in the multipoint mesh virtual private network, the third column including an indication of an ability to communicate with particular nodes with the underlay network, and a fourth column including an indication of an ability to communicate with particular nodes with the multipoint mesh virtual private network.

6. The system according to claim 1, wherein the first, second, and third multipoint mesh virtual private network databases are in the Comma-Separated Values (CSV) format.

7. The system according to claim 1, wherein the underlay network is the Internet.

8. The system according to claim 1, wherein the overlay network utilizes at least one of Internet Protocol Version 4 (IPV4) and Internet Protocol Version 6 (IPV6).

9. The system according to claim 1, wherein the first, second, and third nodes are routers.

10. The system according to claim 1, wherein the first node is designated as a primary node that creates the first multipoint mesh virtual private network database and shares the first multipoint mesh virtual private network database with other nodes.

11. The system according to claim 1, wherein the first, second, and third nodes are configured to limit the number of other nodes that the first, second, and third nodes can establish the multipoint mesh virtual private network with.

12. A method, comprising:
storing, by a first node, a first multipoint mesh virtual private network database including a plurality of underlay addresses in an underlay network for a plurality of nodes, respectively, and a plurality of virtual private network addresses in a multipoint mesh virtual private network for the plurality of nodes, respectively;
receiving, by the first node, a second multipoint mesh virtual private network database from a second node, the second multipoint mesh virtual private network database being stored by the second node and including a third underlay network address for a third node and a third virtual private network address for the third node;
receiving, by the first node, a third multipoint mesh virtual private network database from the third node, the third multipoint mesh virtual private network database being stored by the third node and including a second underlay network address for the second node and a second virtual private network address for the second node;

comparing, by the first node, the first multipoint mesh virtual private network database to the second and third multipoint mesh virtual private network databases to determine if either the second and third underlay addresses and the second and third virtual private network addresses are missing from the first multipoint mesh virtual private network database;

adding, by the first node, the second and third underlay addresses and the second and third virtual private network addresses to the first multipoint mesh virtual private network database based on the comparison, if either the second and third underlay addresses and the second and third virtual private network addresses are determined to be missing from the first multipoint mesh virtual private network database; and establishing, by the first node, the multipoint mesh virtual private network with the second and third nodes using second and third virtual private network addresses, respectively, added to the first multipoint mesh virtual private network database, without relying on a hub.

13. The method according to claim 12, wherein the first, second, and third multipoint mesh virtual private network databases each further include an indication of an ability of the first, second, and third nodes to communicate with other nodes via the underlay network, and an indication of an ability of the first, second, and third nodes to communicate with other nodes via the multipoint mesh virtual private network, the method further including transmitting, by each of the first, second, and third nodes, a portion of the first, second, and third multipoint mesh virtual private network databases, respectively, including the network addresses in the underlay network and the network addresses in the multipoint mesh virtual private network to other nodes, without transmitting the indications of the abilities of the first, second, and third nodes to communication with other nodes via the underlay network and the multipoint mesh virtual private network.

14. The method according to claim 12, further comprising updating, by the first node, the first multipoint mesh virtual private network database to note a first error condition if the first node cannot establish communications with either the second and third nodes via the second and third underlay addresses and a second error condition if the first node cannot establish communications with the second and third nodes via the second and third virtual private network addresses.

15. The method according to claim 12, further comprising establishing, by the first, second, and third nodes, direct Internet Protocol Security (IPSEC)/Internet key Exchange (IKE) communications prior to establishing the multipoint mesh virtual private network.

16. The method according to claim 12, wherein the first, second, and third multipoint mesh virtual private network databases each include four columns, a first column including particular network addresses in the underlay network, the second column including particular network addresses in the multipoint mesh virtual private network, the third column including an indication of an ability to communicate with particular nodes with the underlay network, and a fourth column including an indication of an ability to communicate with particular nodes with the multipoint mesh virtual private network.

17. The method according to claim 12, wherein the first, second, and third multipoint mesh virtual private network databases are in the Comma-Separated Values (CSV) format.

18. The method according to claim 12, wherein the overlay network utilizes at least one of Internet Protocol Version 4 (IPV4) and Internet Protocol Version 6 (IPV6).

19. The method according to claim 12, wherein the first, second, and third nodes are routers.

20. The method according to claim 12, further comprising:
designating the first node as a primary node that creates the first multipoint mesh virtual private network database; and
sharing the first multipoint mesh virtual private network database with other nodes.

\* \* \* \* \*